Dec. 27, 1938.   F. D. WENN   2,141,780
HAND OPERATED BRAKE LEVER
Filed March 3, 1938

FLOYD D. WENN.
INVENTOR.

BY Louis Illmer.
ATTORNEY.

Patented Dec. 27, 1938

2,141,780

UNITED STATES PATENT OFFICE 2,141,780

HAND-OPERATED BRAKE LEVER

Floyd D. Wenn, Binghamton, N. Y., assignor to The Brewer-Titchener Corporation, Cortland, N. Y., a corporation of New York Application March 3, 1938, Serial No. 193,628

9 Claims. (Cl. 74—537)

This invention pertains to certain novel structural aspects that are more particularly adapted for an inverted or so-called suspended emergency brake lever of an automobile or the like motor driven vehicle. The present lever appurtenances are primarily directed to improvements in a bodily shiftable or floating pawl together with a compact actuating mechanism including means for manipulating the same in a reliable and easily understood manner.

The object of my invention is to devise an inherently simple brake lever assembly arranged to be neatly incorporated in automotive bodies and fabricated on a rapid productive basis at low machine labor and assembly cost, and when installed, shall be capable of effectively and repeatedly applying a nicely adjusted braking effect over a long-lived operative period without excessive wear or resulting tooth slippage.

Embodied herein are other improved structural features designed to facilitate the end in view such as resort to fine ratchet teeth that are engaged by multiple pawl teeth without involving excessive slip-back after the brake band has been drawn up to the desired degree, and all of which will hereinafter be more explicitly defined.

Reference is had to the accompanying one sheet of drawings which are illustrative of a preferred embodiment, and in which:

Fig. 1 is an elevational side view of an assembled brake lever equipped with my improved pawl means, and Fig. 2 depicts an edge view thereof.

Figs. 3 and 4 respectively depict an enlarged fragmental cross-sectional detail taken centrally through Fig. 2 showing my pawl mechanism in alternative positions.

Figure 1:
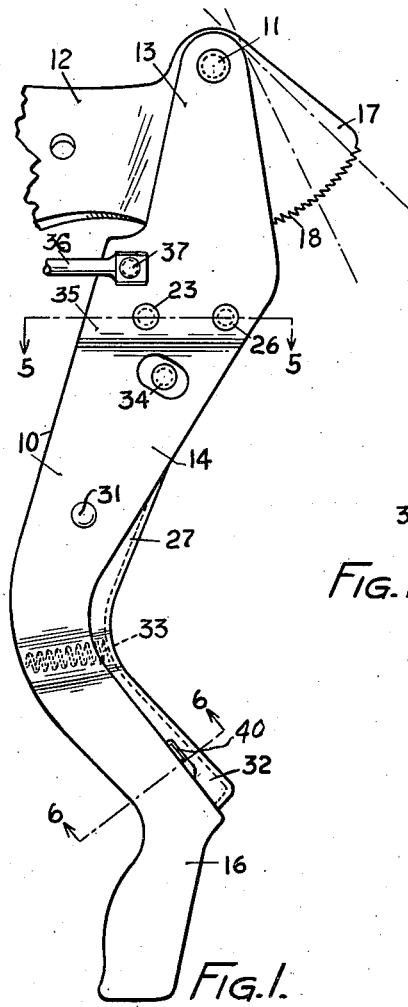
Figure 2:
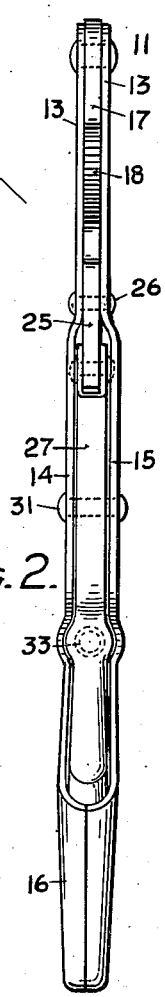

Referring more specifically to said drawing, this comprises a cross-sectionally channeled primary lever 10 preferably of S shaped configuration whose components may be stamped up from sheet metal. The upper suspended end of this lever is shown forked and provided with a main fulcrum 11 that may be carried by a warped bracket plate 12. The respective fork legs such as 13 preferably straddle said plate and the lever shank portion may comprise a pair of exteriorly disposed, web interconnected flanges 14 and 15 that may terminate in a depending tubular end portion 16 and be given a pistol-like grip or other handle formation. In this inverted emergency hand lever, the bracket plate may be demountably supported upon some suitable cowl fixture and which lever except for its grip portion is usually concealed behind the instrument board of an automobile.

The stamped sector plate 17 which preferably forms an integral part of said bracket, is centrally apertured to allow of entering the fulcrum 11 therethrough. The arcuate perimetric edge of my sector plate is serrated to provide for a series of hardened ratchet teeth 18 disposed about the fulcrum axis, the tooth pitch being purposely kept rather close to afford corresponding small gradations in setting up the brake lever. The radial transverse stop or pawl contacting faces of the respective teeth are preferably cut to slope in tangency with a common base circle 19 to permit of free pawl withdrawal without abnormal undercut drag. Said sector plate may be kept relatively thick to afford an adequate tooth width not likely to wear excessively after protracted usage.

A manipulative pawl block 20 is floatingly mounted in a novel bodily shiftable manner flatwise between the widened fulcrum region of my primary flanges. Such pawl is designed to be stamped out of heavy sheet metal and may be given a virtually oblong or the like elongated edge shape of which one transverse end is preferably provided with a plurality of grip teeth 21 adapted to positively mesh with certain mated sector teeth when the brake lever is operatively set. The forward longitudinal edge contiguous to the opposite pawl end, is equipped with an obliquely arranged guide slot 22 affording complementary cam faces that may be slightly inclined with respect to the plane of said grip teeth. It will be obvious that said slot need not be confined to the open mouthed type here shown.

Inserted into said slot is a fixedly held guide or cam pin 23 that may be entered through and riveted to the lever flanges 14 and 15 in a radially distant relation to the pawl teeth, as indicated. A further characteristic of said compactly mounted pawl block resides in the use of an undercut cylindrical socket 24 that is inset from the rearward longitudinal edge of my pawl and whose open mouth is located between the pawl ends in a reversed manner from the guide slot 22.

In order to positively guide said pawl block against drag into and out of tooth engagement, I resort to an intermediate rocker 25 of the bellcrank or the like bifurcated type that is pivotally mounted at 26 and as such may be stamped out of heavy sheet metal. One crank bifurcation, namely the toggle arm or branch may terminate in a rounded nose 25A adapted to constitute a knuckle joint with the undercut pawl socket 24. The apertured other rocker arm or branch may be directed radially outward from the bellcrank pivot 26 as shown, although equivalent results may also be had by the use of a transverse arm disposition.

Nested between the side flanges 14 and 15 is a dished manipulative trip lever 27. This sheet metal member may be cross-sectionally channeled to include a flange interconnecting web 28 which is reversely disposed to the corresponding web of the primary lever flanges. The trip lever side flanges 29 and 30 (see Fig. 6) may be loosely telescoped within the primary lever flanges and pivoted at 31 to constitute a balanced mounting of which the depending lever end may terminate in an encased thumb piece 32. A compression spring 33 serves to automatically raise such depressible member 32 and thereby bring the pawl teeth into operative engagement with the sector. The upper end of the trip lever may be slip connected to the apertured arm of the bell crank 25 by the link pin 34 or otherwise linked. To provide ample clearance space for the nested trip lever, the flanges 14 and 15 may be laterally offset as at 35 and thence carried outward in parallelism. As arranged all my linkage comprising the sector plate, pawl block, rocker arms and trip lever lie in flatwise alignment between the web interconnected flanges of the primary lever.

Figure 6:
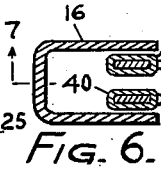
Figure 7:
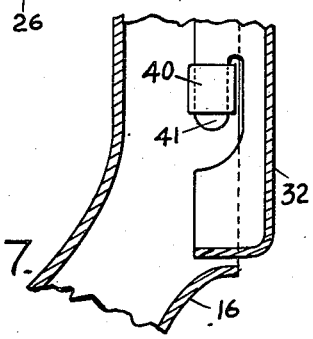
Fig. 7 is taken along line 7—7 of Fig. 6, and Fig. 8 fragmentally exemplifies a certain slip-back tooth effect.

Figs. 6 and 7 fragmentally detail the lower terminal region of said thumb piece. In order to insure quiet action of the trip lever, I preferably resort to the use of mated tubular silencing sleeves 40 comprising a short length of rubber tube or the like stretchable agency. To receive and mount the same, the side flanges of the trip lever may be pierced to punch out the mated integral prongs such as 41 over which said circumscribing sleeve may be snugly slipped in place. When thus installed, the several sleeves cushion the nested lever members against metallic rattle without binding effects.

My thumb piece 32 is preferably faced toward the seated driver. By grasping the suspended lever grip 16, the brakes may be applied by tensioning the draft rod 36 which is herein carried to the primary lever by the pivot pin 37 or the like attachment. When the thumb piece is depressed against spring tension, it will correspondingly rock the trip lever and thereby throw the ratchet pawl 20 from its engaged Fig. 3 position into its Fig. 4 released position. The primary intent is to provide for a manipulative pawl which shall be bodily shiftable and accurately guided into and out of tooth engagement, such guidance being effected in an extremely simple manner without need of the more complicated or costly mechanism of the cross head type. In addition to being compactly and neatly encased within the widened flange portion of the primary lever, the few required working parts may be economically fabricated by stamping methods.

As devised, my pawl is readily liftable out of tooth engagement by a comparatively small thumb pressure, whereupon the primary lever is free to rock in either direction. The teeth are intentionally kept low in height to minimize pawl travel. In order that a safer clutch action may be had, my pawl is provided with multiple teeth. The oblique slot 22 and its guide pin 23 may be so disposed as to bring about a straight lined pawl travel that moves radially toward or away from the axis of the fulcrum 11. In one extreme of travel, the trip lever is stopped by a completed tooth engagement with the sector and in the other position, by having the bottom of the pawl slot 22 abut the guide pin 23. Said linear bodily shift on part of my floating pawl is solely effected by the combined guiding action of the nose 25A and the pin 23 whereby the pawl teeth are made to engage with or released from all serrations of the sector plate 17 simultaneously.

Although such plural teeth may not be undercut, they effectively retain my floating pawl in interlocked engagement against slip and at the same time facilitate brake release without strain on part of the operator. It will also be observed that a single spring suffices for present purposes and that a single grip tooth may be substituted for the described multiple block teeth.

Figure 3:
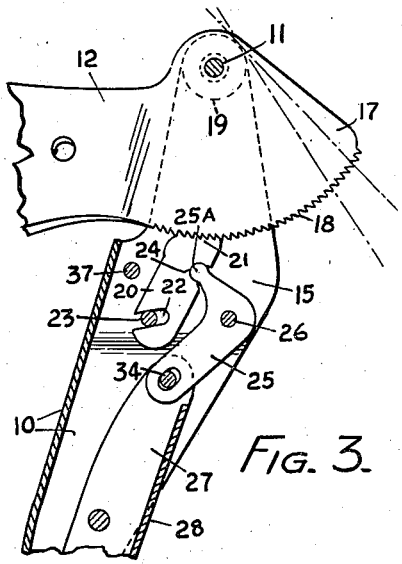
Figure 4:
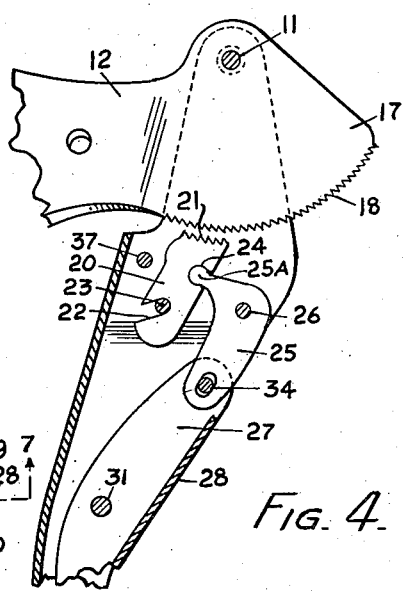
Figure 5:
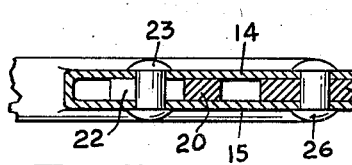
Fig. 5 represents a transverse view of the nested lever members taken along 5—5 of Fig. 1, and Fig. 6 a corresponding view along line 6—6 detailing certain anti-rattler devices.

As will be seen from Fig. 3, the nose carrying arm of my bell crank 25 serves as a toggle joint with respect to the pivot 26 and the engaged sector teeth 18, whereby any heavy counterpull exerted by the brake rod 36 will more tightly throw the pawl teeth 21 into wedged engagement with said sector teeth.

Figure 8:
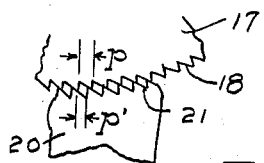

The permissible use of a relatively fine pitch for my sector teeth as used in combination with multiple pawl teeth, still affords adequate tooth face area without slippage or tendency to wear the respective tips into a rounded condition. An outstanding advantage of such finer teeth resides in the fact that when the applied brake rod has been drawn up under maximum allowable tension and it is desired to closely retain such operative setting, the incidental pawl slip-back such as $p'$ of Fig. 8, must first be taken up before the pawl teeth can operatively grip the sector. This slipback will be reduced in a proportionate relation to the tooth pitch $p$, that is to say a coarse tooth pitch would involve a correspondingly greater slip-back. If allowed to become excessive, the brake may fail to hold a car while standing on a steep hillside.

Furthermore, with my layout, the radius of the arcuate sector teeth 18 may be kept closer to the main fulcrum 11 and thus allow of attaching the draft pin 37 slightly beyond said teeth and thereby afford a relatively large leverage on part of the pistol grip 16 for a given overall lever length.

It is thought the foregoing detailed explanation will make evident to those skilled in this art, the intended function and mode of operation of the working parts, it being understood that I reserve the right to likewise modify my illustrative embodiment, all without departing from the spirit and scope of my invention heretofore described and more particularly pointed out in the appended claims.

I claim:

1. The combination of a primary lever provided with a pivot located intermediate the respective lever ends, a manipulative trip lever mounted to rock upon said pivot, a main fulcrum for one such lever end region, a sector plate having a series of ratchet teeth grouped about the fulcrum axis, a brake rod pivotally attached to the primary lever, an elongated floating pawl block equipped with tooth engaging means and having opposed longitudinal edges of which one such edge region is provided with guide slot means and the other edge region is provided with socket means, cam pin means carried by the primary lever and cooperatively entered through the slot means, and bifurcated rocker means pivoted upon the primary lever of which one rocker branch is arranged to constitute a positively interconnected knuckle joint with said socket means, the other rocker branch being operatively linked to the manipulative trip lever.

2. A primary lever having a channeled cross-sectional profile to include complementary flanges provided with a pivot located intermediate the respective flange ends and further provided with cam pin means, a main fulcrum for one such flange end region, a sector plate having a series of ratchet teeth grouped about the fulcrum axis, a brake rod pivotally attached to the primary lever, in combination with the following working parts stamped up out of sheet metal, namely: a spring actuated manipulative trip lever mounted to rock upon the aforesaid pivot, an elongated floating pawl block interposed between the lever flanges, said block being equipped with tooth engaging means and having opposed longitudinal edges of which one such edge region is provided with guide slot means arranged to cooperate with the cam pin means and the opposed edge region is provided with socket means, and bifurcated rocker means pivoted upon the primary lever of which one rocker branch is arranged to constitute a knuckle joint with said socket means and the other of which branches is slip connected to the trip lever.

3. The combination of a primary lever provided with a pivot located intermediate the respective lever ends, a manipulative trip lever mounted to rock upon said pivot, a main fulcrum for one such primary lever end region, a sector plate having a series of ratchet teeth grouped about the fulcrum axis, a brake rod pivotally attached to the primary lever, an elongated floating pawl block equipped with multiple grip teeth disposed at one end of said block for meshed engagement with certain of the sector teeth and the other end region of which block is provided with guide slot means including a cam face, cam pin means carried by the primary lever and arranged to cooperate with said face, and bifurcated rocker means pivoted upon the primary lever of which one rocker branch is operatively linked to the trip lever and the other branch is positively attached to the block by knuckle joint means located intermediate the block ends, said trip lever when manipulated serving to impart a substantially rectilinear movement to said block in a radial direction with respect to the fulcrum axis whereby to simultaneously withdraw all the grip teeth into or out of meshed engagement.

4. The combination of a primary lever having a channeled cross-sectional profile to include complementary flanges provided with a pivot located intermediate the respective flange ends, a spring actuated balanced trip lever mounted to rock upon said pivot when manipulated, a main fulcrum for one such flange end region, a sector plate having a series of ratchet teeth grouped about the fulcrum axis, a brake rod pivotally attached to the primary lever, an elongated floating pawl block equipped with tooth engaging means and having opposed longitudinal edge regions respectively provided with guide slot means and with a cylindrical socket having an undercut mouth, cam pin means carried by the primary lever and cooperatively entered through the slot means, and bifurcated rocker means pivoted upon the primary lever of which the terminal of one rocker branch is shaped into a rounded nose to constitute a knuckle joint with said socket and the other of which branches is operatively linked to the manipulative trip lever, the aforesaid sector plate, the pawl block rocker means and the trip lever being operatively interposed flatwise between the lever flanges in substantial planiform alignment.

5. The combination of a primary lever provided with a pivot located intermediate the respective lever ends, a manipulative trip lever mounted to rock upon said pivot, a main fulcrum for one such primary lever end region, a sector plate having a series of ratchet teeth grouped about the fulcrum axis and the respective radial stop faces of which teeth tangentially slope toward a common base circle, a brake rod pivotally attached to the primary lever, an elongated floating pawl block equipped with multiple grip teeth disposed at one end of said block for meshed engagement with certain of the sector teeth and the other end region of which block is provided with guide slot means including a cam face, cam pin means carried by the primary lever and arranged to cooperate with said face, and bifurcated rocker means pivoted upon the primary lever of which one rocker branch is operatively connected to the trip lever and the other branch is operatively attached to the block by knuckle joint means located intermediate the block ends, said trip lever when manipulated serving to simultaneously release all of the meshed pawl block teeth without undercut drag.

6. The combination of a primary lever having a channeled cross-sectional profile to include web interconnected flanges provided with a pivot located intermediate the respective flange ends, a balanced manipulative trip lever loosely nested between said flanges and mounted to rock upon the pivot thereof, said trip lever also having a channeled cross-sectional profile to include side flanges that are respectively provided with a prong, a separate cushioning sleeve circumscribing each such prong, a main fulcrum for the primary lever, a sector plate having a series of ratchet teeth grouped about the fulcrum axis, a draft rod pivotally attached to the primary lever, an elongated pawl equipped with tooth engaging means and having opposed longitudinal edge regions respectively provided with slot means and with socket means, cam pin means cooperatively entered through the slot means, and bifurcated rocker means pivoted upon the primary lever of which one rocker branch is arranged to constitute a knuckle joint with said socket means and the other branch is operatively connected to the trip lever.

7. The combination of a primary lever having a channeled cross-sectional profile to include web interconnected flanges with a pivot located intermediate the respective flange ends, a balanced manipulative trip lever loosely nested between said flanges and mounted to rock upon the pivot thereof, said trip lever having a channeled cross-sectional profile to include complementary side flanges that are respectively provided with an integral prong shaped to mount a sleeve thereon, a separate cushioning sleeve circumscribing each such prong and serving as anti-rattle means respectively interposed between the several flanges of nested levers, a main fulcrum for the primary lever, a sector plate having a series of ratchet teeth grouped around the fulcrum axis, a pawl equipped with tooth engaging means, and means operatively interconnecting the trip lever with said pawl.

8. The combination of a rigid brake lever mounted to turn around a main fulcrum, sector plate means provided with a series of ratchet teeth grouped about the fulcrum axis, a pawl block that is shiftably mounted upon said lever intermediate the lever ends and equipped with a grip tooth, said block being positively guided to shift its tooth into or out of engagement with a certain sector tooth in a maintained radial direction with respect to the main fulcrum, bifurcated rocker means pivoted to the primary lever of which one rocker branch pivotally cooperates with the pawl block to constitute a toggle joint relative to the rocker pivot whereby the engaged grip tooth is wedged toward said fulcrum in a proportionate relation to the tension exerted by the brake rod, and means for manipulating the other branch of the rocker means.

9. The combination of a rigid brake lever mounted to turn around a main fulcrum, sector plate means provided with a series of finely pitched ratchet teeth grouped about the fulcrum axis, a brake rod pivotally attached to said lever in proximity to said teeth and adapted to be tensioned by the lever, a floating pawl block that is shiftably mounted upon said lever intermediate the lever ends and equipped with multiple grip teeth arranged to shift simultaneously into or out of completed engagement with certain of the sector teeth along a path directed radially with respect to the main fulcrum, said finely pitched sector teeth serving to substantially minimize slip-back prior to the completed engagement of the grip teeth, bifurcated rocker means pivoted to the primary lever of which one rocker branch positively cooperates with the pawl block to constitute a toggle joint relative to the rocker pivot whereby the engaged grip teeth are wedged toward said fulcrum in proportionate relation to the tension exerted by the brake rod, and means for manipulating the other branch of the rocker means.

FLOYD D. WENN.